US008380697B2

(12) United States Patent
Benyamin et al.

(10) Patent No.: US 8,380,697 B2
(45) Date of Patent: Feb. 19, 2013

(54) SEARCH AND RETRIEVAL METHODS AND SYSTEMS OF SHORT MESSAGES UTILIZING MESSAGING CONTEXT AND KEYWORD FREQUENCY

(75) Inventors: Daniel Benyamin, Los Angeles, CA (US); Michael Aaron Hall, Valencia, CA (US)

(73) Assignee: CitizenNet Inc., Beverly Hills, CA (US)

( * ) Notice: Subject to any disclaimer, the term of this patent is extended or adjusted under 35 U.S.C. 154(b) by 52 days.

(21) Appl. No.: 12/909,576

(22) Filed: Oct. 21, 2010

(65) Prior Publication Data

US 2011/0093455 A1 Apr. 21, 2011

Related U.S. Application Data

(60) Provisional application No. 61/253,720, filed on Oct. 21, 2009.

(51) Int. Cl.
*G06F 7/00* (2006.01)
*G06F 17/30* (2006.01)
(52) U.S. Cl. ......... 707/710; 707/731; 707/748; 707/771
(58) Field of Classification Search ........................ None
See application file for complete search history.

(56) References Cited

U.S. PATENT DOCUMENTS

| | | | |
|---|---|---|---|
| 5,835,087 A | 11/1998 | Herz et al. | |
| 5,999,902 A * | 12/1999 | Scahill et al. | 704/240 |
| 6,571,234 B1 * | 5/2003 | Knight et al. | 1/1 |
| 6,766,349 B1 | 7/2004 | Belkin | |
| 7,089,226 B1 * | 8/2006 | Dumais et al. | 707/740 |
| 7,421,395 B1 | 9/2008 | Link et al. | |
| 7,603,349 B1 * | 10/2009 | Kraft et al. | 1/1 |
| 7,657,515 B1 | 2/2010 | Jewell | |
| 7,734,627 B1 | 6/2010 | Tong | |
| 7,743,051 B1 * | 6/2010 | Kashyap et al. | 707/713 |
| 7,925,496 B1 | 4/2011 | Rubin | |
| 8,086,631 B2 * | 12/2011 | Gollapudi et al. | 707/771 |
| 8,301,616 B2 * | 10/2012 | Guha et al. | 707/708 |
| 2002/0062368 A1 | 5/2002 | Holtzman et al. | |
| 2003/0028595 A1 * | 2/2003 | Vogt et al. | 709/204 |
| 2003/0164855 A1 | 9/2003 | Grant et al. | |
| 2005/0080613 A1 | 4/2005 | Colledge et al. | |
| 2005/0204002 A1 * | 9/2005 | Friend | 709/206 |
| 2006/0069589 A1 | 3/2006 | Nigam et al. | |
| 2006/0242128 A1 | 10/2006 | Goel | |

(Continued)

OTHER PUBLICATIONS

Fang Liu, Clement Yu, Weiyi Meng "Personalized Web Search for Improving Retrieval Effectiveness", IEEE Transactions on Knowledge and Data Engineering, vol. 16, No. 1, Jan. 2004.*

(Continued)

*Primary Examiner* — Polina Peach
(74) *Attorney, Agent, or Firm* — Kauth, Pomeroy, Peck & Bailey LLP

(57) ABSTRACT

Systems and methods of identifying and retrieving messages that satisfy a search query using the context of the message and term frequencies are provided. One embodiment includes identifying at least one category relevant to the search query, wherein a plurality of scored keywords are associated with each category, selecting at least one of the scored keywords that is relevant to an identified category, performing a plurality of searches of messages from a social networking messaging service to retrieve messages, where at least one search includes retrieving messages based on the original search query and one of the selected scored keywords, scoring the retrieved messages with respect to each of the at least one identified categories using at least the scored keywords relevant to each category, and returning at least the message with the highest score as the search result.

14 Claims, 4 Drawing Sheets

U.S. PATENT DOCUMENTS

| | | | |
|---|---|---|---|
| 2006/0253437 | A1 | 11/2006 | Fain et al. |
| 2007/0124432 | A1* | 5/2007 | Holtzman et al. ............ 709/219 |
| 2007/0260580 | A1 | 11/2007 | Omoigui |
| 2008/0021884 | A1* | 1/2008 | Jones et al. ........................ 707/3 |
| 2008/0059488 | A1 | 3/2008 | Iyengar et al. |
| 2008/0091670 | A1* | 4/2008 | Ismalon ............................ 707/5 |
| 2008/0172368 | A1* | 7/2008 | Chowdhury et al. ............. 707/3 |
| 2008/0222142 | A1 | 9/2008 | O'donnell |
| 2008/0243842 | A1* | 10/2008 | Liang et al. ........................ 707/6 |
| 2008/0294624 | A1* | 11/2008 | Kanigsberg et al. .............. 707/5 |
| 2009/0063469 | A1 | 3/2009 | Gross |
| 2009/0109872 | A1 | 4/2009 | Skubacz et al. |
| 2009/0119167 | A1 | 5/2009 | Kendall et al. |
| 2009/0119261 | A1* | 5/2009 | Ismalon ............................ 707/3 |
| 2009/0216696 | A1 | 8/2009 | Downs et al. |
| 2010/0169327 | A1* | 7/2010 | Lindsay et al. ............... 707/750 |
| 2010/0223279 | A1 | 9/2010 | Scott |
| 2010/0268628 | A1 | 10/2010 | Pitkow et al. |
| 2010/0293170 | A1 | 11/2010 | Hall et al. |
| 2011/0060794 | A1 | 3/2011 | Sweeney |
| 2011/0078130 | A1* | 3/2011 | Roizen et al. ................. 707/706 |
| 2011/0093455 | A1 | 4/2011 | Benyamin et al. |
| 2011/0145348 | A1 | 6/2011 | Benyamin et al. |
| 2012/0004959 | A1 | 1/2012 | Benyamin et al. |
| 2012/0158489 | A1 | 6/2012 | Benyamin et al. |
| 2012/0158518 | A1 | 6/2012 | Benyamin et al. |

OTHER PUBLICATIONS

Evrim Acar, Seyit A. Camtepe, Mukkai S. Krishnamoorthy, and ulent Yener "Modeling and multiway analysis of chatroom tensors" ISI'05 Proceedings of the 2005 IEEE international conference on Intelligence and Security Informatics pp. 256-268.*

"Automatic Expansion of Domain-Specific Lexicons by Term Categorization", ACM Transactions on Speech and Language Processing, vol. 3, No. 1, May 2006, pp. 1-30.

Ambekar et al., "Name-Ethnicity Classification from Open Sources", KDD '09, Jun. 28-Jul. 1, 2009, 9 pgs.

Androutsopoulos et al., "An Evaluation of Naive Bayesian Anti-Spam Filtering", Proceedings of the workshop on machine Learning in the New Information Age, 2000, pp. 9-17.

Argamon et al., "Gender, Genre and Writing Style in Formal Written Texts", Source and date unknown, 32 pgs.

Backstrom et al., "Find Me if You Can: Improving Geographical Prediction with Social and Spatial Proximity", WWW, 2010, 10 pgs.

Backstrom et al., "Network Bucket Testing", Source and date unknown, 10 pgs.

Bakshy et al., "Everyone's an Influencer: Quantifying Influence on Twitter", WSDM '11, Feb. 9-12, 2011, 10 pgs.

Bakshy et al., "The Role of Social Networks in Information Diffusion", Source and date unknown, 9 pgs.

Bernstein et al., "Eddi: Interactive Topic-based Browsing of Social Status Streams", UIST, 2010, 10 pgs.

Berwick, "An Idiot's Guide to Support Vector Machines (SVMs)", Source and date unknown, 25 pgs.

Blei et al., "Latent Dirichlet Allocation", Source and date unknown, 8 pgs.

Bollen et al., "Modeling public mood and emotion: Twitter sentiment and socio-economic phenomena", WWW, Apr. 2010, 10 pgs.

Burke et al., "Feed Me: Motivating Newcomer Contribution in Social Network Sites", CHI 2009, Apr. 4-9, 2009, 10 pgs.

Burke et al., "Social Capital on Facebook: Differentiating Uses and Users", CHI, 2011, 10 pgs.

Burke et al., "Social Network Activity and Social Well-Being", CHI 2010, 4 pgs.

Cer et al., "Parsing to Stanford Dependencies: Trade-offs between speed and accuracy", Source and date unknown, 5 pgs.

Chang, "Not-So-Latent Dirichlet Allocation: Collapsed Gibbs Sampling Using Human Judgments", Proceedings of the NAACL HLT 2010 Workshop on Creating Speech and Language Data with Amazon's Mechanical Turk, pp. 131-138.

Chang et al., "ePluribus: Ethnicity on Social Networks", Association for the Advancement of Artificial Intelligence, 2010, 8 pgs.

Ghosh et al., "Community Detection Using a Measure of Global Influence", 2nd SNA-KDD Workshop, 2008, 9 pgs.

Ghosh et al., "Structure of Heterogeneous Networks", Source unknown, Jun. 11, 2009, 8 pgs.

Go et al., "Twitter Sentiment Analysis", CS224N—Final Project Report, Jun. 6, 2009, 17 pgs.

Go et al., "Twitter Sentiment Classification Using Distant Supervision", Source and date unknown, 6 pgs.

Hearst, "Trends & Controversies—Support Vector Machines", IEEE Intelligent Systems, Jul./Aug. 1998, pp. 18-28.

Joachims, "Text Categorization with Support Vector Machines: Learning with Many Relevant Features", Universitat Dortmund Fachbereich Informatik, Nov. 1997, 18 pgs.

Kim et al., "Literary Style Classification with Deep Linguistic Analysis Features", Source and date unknown, 7 pgs.

Kintsch, "Predication", Source and date unknown, 40 pgs.

Kintsch, "The Role of Knowledge in Discourse Comprehension: A Construction-Integration Model", Psychological Review, 1988, vol. 95, No. 2, pp. 163-182.

Kramer, "An Unobtrusive Behavioral Model of "Gross National Happiness"", CHI 2010: Language 2.0, Apr. 10-15, 2010, pp. 287-290.

Lerman, "Semantic Labeling of Online Information Sources", Source and date unknown, 19 pgs.

Li et al., "Keyword Extraction for Social Snippets", WWW 2010, Apr. 26-30, 2010, 2 pgs.

Lu et al., "Opinion Integration Through Semi-supervised Topic Modeling", WWW 2008, Refereed Track: Data Mining—Modeling, Apr. 21-25, 2008, pp. 121-130.

Meyer, "Support Vector Machines", Source unknown; Sep. 12, 2011, pp. 1-8.

Mishne, "Experiments with Mood Classification in Blog Posts", Style 2005, 8 pgs.

Pang et al., "Opinion Mining and Sentiment Analysis", Foundations and Trends in Information Retrieval, 2008, vol. 2, Nos. 1-2, pp. 1-135.

Ratkiewicz et al., "Detecting and Tracking the Spread of Astroturf Memes in Microblog Streams", Source unknown, Nov. 2010, 10 pgs.

Scott et al., "Text Classification Using WordNet Hypernyms", Source and date unknown, pp. 45-51.

Sun et al., "Gesundheit! Modeling Contagion through Facebook News Feed", Association for the Advancement of Artificial Intelligence, 2009, 8 pgs.

Tyler et al., "Retrieval Models for Audience Selection in Display Advertising", CIKM 2011, 6 pgs.

Wallach, "Topic Modeling: Beyond Bag-of-Words", Source unknown, Jun. 26, 2006, 40 pgs.

Wilson et al., "Term Weighting Schemes for Latent Dirichlet Allocation", Human Language Technologies: The 2010 Annual Conference of the North American Chapter of the ACL, pp. 465-473.

Zheng et al., "A Framework for Authorship Identification of Online Messages: Writing-Style Features and Classification Techniques", Journal of the American Society for Information Science and Technology, 2006, vol. 57, No. 3, pp. 378-393.

* cited by examiner

SEARCH AND RETRIEVAL METHODS AND SYSTEMS OF SHORT MESSAGES UTILIZING MESSAGING CONTEXT AND KEYWORD FREQUENCY

CROSS REFERENCE TO RELATED APPLICATIONS

This application claims the benefit of U.S. Provisional Patent Application No. 61/253,720, filed on Oct. 21, 2010, the disclosure of which is hereby incorporated by reference as if set forth in full herein.

BACKGROUND

The invention generally relates to messaging in social networks, and more particularly relates to searching and retrieving messages using messaging context and keyword frequency.

The Internet is a tremendous source of information, but finding a desired piece of information has been the preverbal "needle in the haystack". For example, services like blogs provide data miners a daunting task of perusing through extensive amounts of text in order to find data that can become applicable for other uses. Hence, text data mining and information retrieval systems designed for large collections of lengthy documents have arisen out of the practical need of finding a piece of information in the massive collections of varied documents (such as the World Wide Web) or in databases of professional documents (such as medical or legal documents). Likewise, with the popularity of social networking increasing every day, the amount of user-generated content from these social networking sites continues to grow. Thus, finding information that is relevant and useable is quickly becoming more difficult.

These popular social networking services or options, like Twitter messages or Facebook statuses, are typically much shorter in length than full web pages. This brevity however makes it increasingly difficult to use current filtering techniques specifically designed to sort through large amounts of data. For example, popular techniques, such as term frequency-inverse document frequency (TF-IDF) weighting, are dependent on both the collection of information, as well as the average document size, to be large.

Additionally, in recent years there has been an increase in the number of very short documents, usually in the form of user generated messages or comments. Typical user generated messages have come from a number of sources, for example, instant messaging programs, such as AOL instant messenger; online chat rooms; text messages from mobile phones; message publication services, such as Twitter; and "Status" messages, such as those on Facebook pages. Thus, with the rising popularity of these messaging services, there has become a need to search the messages for their content. Some techniques of searching short messages consist simply of doing regular expression matching. However, these techniques typically fail when a term being searched is ambiguous and/or used in unrelated topics. For example, searching for "Amazon" could result in finding messages about the Amazon river and the online retailer, Amazon. Also, if additional terms are provided, many relevant messages may be omitted. For example, searching for "Amazon river" would not match the message "Hiked to the Amazon today—what a beautiful jungle this is", whereas a webpage or a large document about the Amazon River would likely contain both the words "Amazon" and "river", while a short message may not.

Additionally, due to the tremendous volume of messages flowing through a social media network, the number of messages that can be stored over a period of time can be quite substantial. Searches looking for a particular word or words in messages can result in a similarly large search result of identified messages within a relatively small time period. For example, the more common the term the shorter the time period and/or the larger the number of most recent messages. Also, as previously noted, ambiguous terms, e.g., "Amazon" or "tool", can also cause additional issues e.g., false positives.

Accordingly, there is a need to provide a message searching and retrieval system to identify relevant short messages while overcoming the obstacles and shortcomings previously noted and recognized in the art.

SUMMARY

Generally, systems and methods of identifying and retrieving messages that satisfy a search query using the context of the message and term frequencies are provided. One embodiment includes identifying at least one category relevant to the search query, wherein a plurality of scored keywords are associated with each category, selecting at least one of the scored keywords that is relevant to an identified category, performing a plurality of searches of messages from a social networking messaging service to retrieve messages, where at least one search includes retrieving messages based on the original search query and one of the selected scored keywords, scoring the retrieved messages with respect to each of the at least one identified categories using at least the scored keywords relevant to each category, and returning at least the message with the highest score as the search result.

In a further embodiment, the user indicates at least one category relevant to the search query.

In another embodiment, the query is scored with respect to each category using the scored keywords associated with each category and at least one category is identified based upon the query score.

In a yet further embodiment, selecting at least one of the scored keywords that is relevant to an identified category includes selecting a plurality of scored keywords relevant to an identified category, and performing a plurality of searches of messages from a social networking messaging service further includes performing a separate search for each of the selected scored keywords, where each search includes retrieving messages based on the original search query and the selected scored keyword.

In yet another embodiment, performing a plurality of searches of messages from a social networking messaging service further includes performing a search, where the messages are retrieved based on the original search query.

In a still further embodiment, scoring the retrieved messages with respect to each of the at least one identified categories using the scored keywords relevant to each category further includes excluding any scored keyword used in the search that retrieved the message from the scoring of the message.

In still another embodiment, the searches include performing expression matching.

In a further embodiment again, the searches include scoring the message with respect to the original search query and the selected scored keyword.

In another embodiment again, scoring the retrieved messages further includes weighting messages based upon the amount of time that has elapsed since the message was posted.

The above-mentioned and other features of this invention and the manner of obtaining and using them will become more apparent, and will be best understood, by reference to the following description, taken in conjunction with the accompanying drawings. The drawings depict only typical embodiments of the invention and do not therefore limit its scope.

DESCRIPTION

Figure 1:
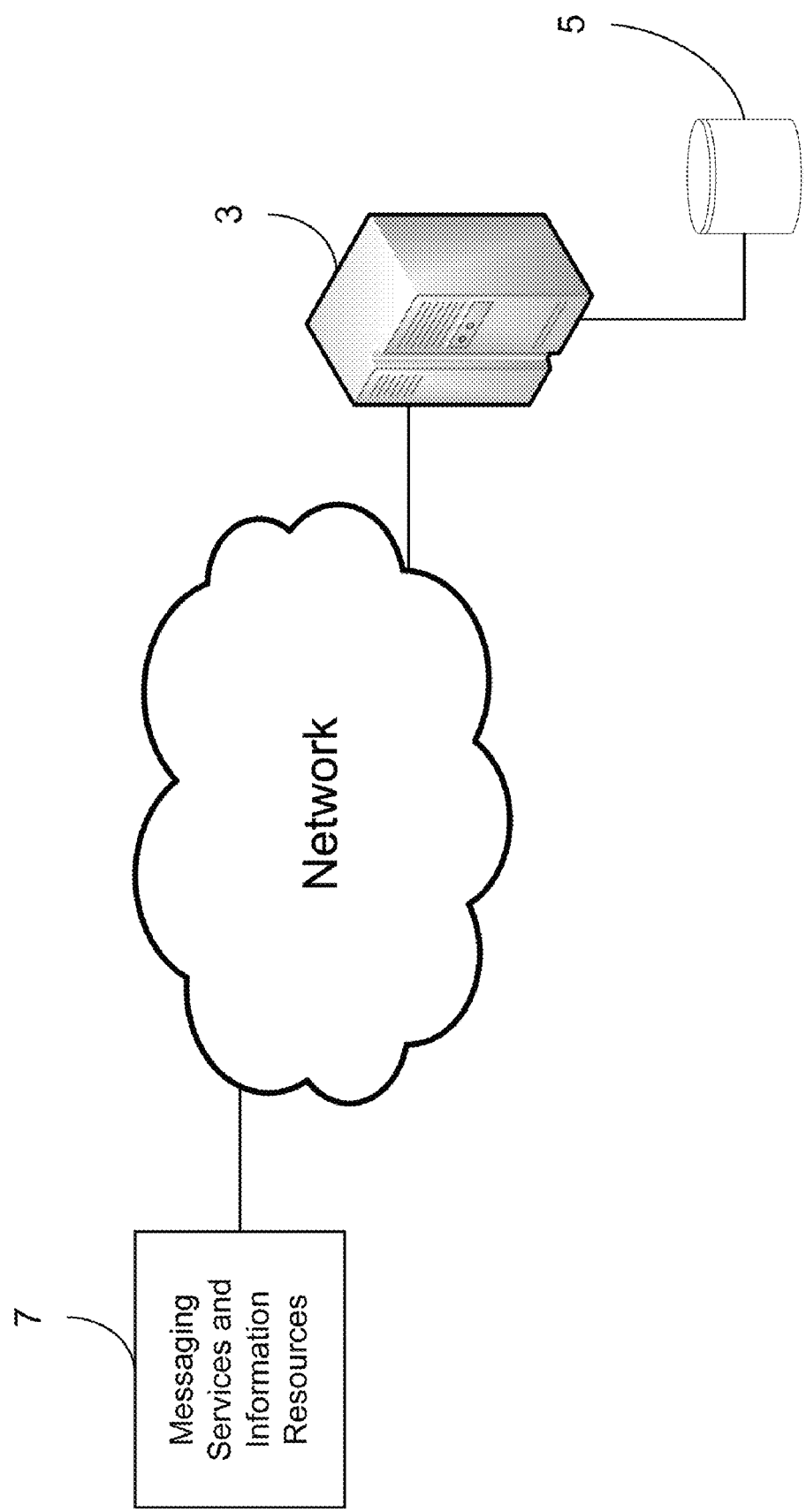
FIG. 1 is a block diagram illustrating a messaging search and retrieval system in accordance with various embodiments of the invention.

In various embodiments, methods and systems are provided to enhance searching of messages in a social network. In one embodiment, a user provides a search query. Given the search query, topic relevance is utilized to determine a particular topic or topics appropriate for the search query. In another embodiment, the user specifies the desired topic the search results should fall into. In one embodiment, topics or categories are set up with associated keywords in which short messages are identified and placed in an appropriate category. In various embodiments, categories are subject or topic containers that include, but are not limited, to a person, place or thing. Keywords extracted from short messages that are relevant to a category are associated with the corresponding category. With the topic and extracted keywords, one or more ("N") parallel searches are conducted to assist in locating the relevant messages. Such searches include but are not limited to the following:

Original query that comprises the search query for information on a specific topic.

Original query plus high frequency first keyword from the identified topic.

Original query plus high frequency second keyword from the identified topic.

Original query plus high frequency last keyword from the identified topic.

The number of concurrent searches may be limited to the highest frequency N keywords to limit the time it takes to conduct the search.

Subsequently, each message for a given topic is scored and ranked by score. The most relevant and, in some cases, the most recent relevant messages are returned to the searcher, e.g., a user or client system, that provided the search query. In order for fair scoring, the additional keyword may not be counted in the scoring of the message.

Categories and Keywords

In one embodiment, categories of interest are generated by identifying a specific subject or topic, such as a person, place or an object. The categories in one embodiment are refined based on usage performance. In particular, categories focused on things perform well with narrower descriptions having a better performance. For example, a category such as "sports" would not perform as well as "basketball", which would not perform as well as "UCLA basketball". These fine grained categories however can come at the cost of increased processing time and storage. In one embodiment, each category is unique having no overlap with other categories.

For each category generated, one or more keywords are identified and associated with each category. In one embodiment, keywords are stored in tables in which each category may have multiple tables. The keywords that are stored come from messages in the desired medium. As such, in one embodiment, within each category, there is a specific table with one or more specific keywords for each medium. Each medium, e.g., messaging service, can have different message formats and/or terminology used. For example, text messages from a mobile phone can and will often look quite different from messages posted to Facebook. Thus, keywords from other sources in one embodiment are only used as a search query into the desired message format. In this way the keyword tables can account for slang terms and other such differentiators specific to the medium. In a number of embodiments, one or more of the following processes can be used to identify the keywords.

Unambiguous Training

For a given category, e.g., musical artists, there can be ambiguous and unambiguous terminology. For example, an artist name can be ambiguous ("the Beatles") or unambiguous ("Paul McCartney"). Utilizing unambiguous terminology, every keyword used in a message containing "Paul McCartney" would be stored, and the usage frequencies of the keywords would be used as a measure of how related to the musical artist category a given query would be.

User Tagging

A message database in one embodiment would allow for manual tagging of information. These tags are created by users as a means to self-classify messages. One example is preceding a tag name with a unique character, e.g., a "#" character. For example, if a message contains "#oscars", then presumably the message is about the Oscars awards ceremony. As such, keywords about the Oscars awards ceremony can be generated by finding every message with the "#oscars" tag, and store each of the keywords present in the located messages. The resulting table would thus include words commonly used to describe the ceremony, and thus a message that did not have a "#oscars" tag can be located using the table.

Third-Party Information

In one embodiment, a third party database or similar resource can be used to identify keywords. For example, utilizing a resource, such as Wikipedia, as a large collection of words related to a category, a TF-IDF analysis of this resource would yield the most important keywords for a given category. Messages could be searched to locate messages that used these keywords in which each of the resulting message-based keywords are stored in the associated category's table.

Category and Message Scoring

A message score for a given category is a measure of how likely its keywords are present in all the messages related to the category. The message scores are defined by $$\text{score}(m, c) = \sum_{g \in m} f(P(g, c))$$

where m is a given message, c is a given category, g is a keyword in the message, and P(g,c) is the normalized frequency of a message in category c containing the keyword g. The function $f$ is a thresholding or quantization function.

Quantization Function $f$

Most category tables have probability distributions that follow a power-law distribution. However, the resulting tables may have a large number of small values, or conversely, a small number of large values. In such cases it may be helpful to pass this table through a quantization function. The simplest function is simply a threshold, by which any keywords that do not pass the threshold have frequencies set to 0. More complex quantizers are used to simplify the table, boost certain values, or otherwise be shaped to improve the scoring performance.

A final message score is defined as $w_{score} \cdot \text{score}(m,c_q) + w_{match} \cdot \text{match}(m,q)$, where w is a weight [0 ... 1], $\text{score}(m,c_q)$ is the score of the message in the query's category, and match (m,q) is the percentage of keywords that match between message m and the query q. This value is used to ensure that the messages have some similarity to the query, even if they both score high in a category.

Referring now to an example, if the query is "Amazon river", then this query would rank high in a category about rivers, the Amazon jungle, or even geographical categories. This query however would score lower in categories about companies, as the term "river" would not occur very frequently in these categories. Similarly, the message "Hiked to the Amazon today—what a beautiful jungle this is" would also rank high in the category of geographical messages, as the keywords "hiked" and "jungle" would appear often in such categories. Finally, the message matches 50% of the terms in the query (i.e., "Amazon"), ensuring that the message has a relation to the query and not just the category as a whole.

Referring now to drawings, a message classification and retrieval system is shown in FIG. 1. The system includes a message server 3 that is coupled with a message database 5 and is in network communication with a plurality of messaging services and information sources 7. The message server receives user generated messages from the plurality of messaging services and information sources. The received messages are stored in category records in the message database and keywords are selected from the received messages and associated with the category records. The message server also scores each message which is stored in the message database and associated with the corresponding category records. Although the system is shown as storing messages, in many embodiments messages are retrieved from the messaging service(s) as needed.

The message server 3 also receives search queries externally from, for example, messaging services or web servers or internally, for example, through a user interface in communication with the message server. For each received search query, the message server calculates a score that identifies a specific category. Utilizing the score, the server retrieves the associated category record from the message database. Messages stored or associated with the category record is retrieved by the server and transmitted back to a designated recipient, e.g., the sender of the search query. In one embodiment, the message server calculates or retrieves a final message score for the identified category for the stored messages. Utilizing the final message score, the server selects specific messages stored or associated with the category record for transmission to a designated recipient.

Figure 2:
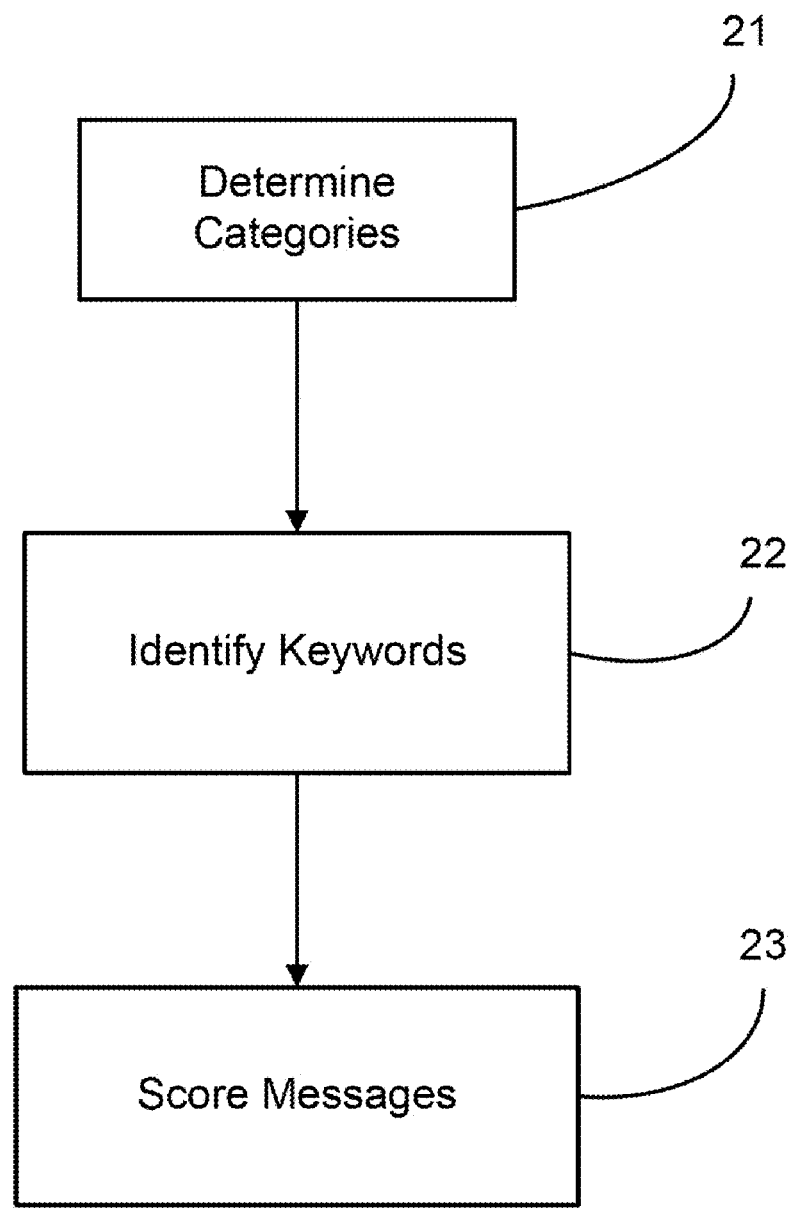
FIG. 2 is a flowchart illustrating a messaging classification or topic generation process in accordance with various embodiments of the invention.

In FIG. 2, a messaging classification generation process in accordance with various embodiments of the invention is illustrated. Initially, categories are first determined (21). Keywords are identified and used to populate tables for each determined category (22). In one embodiment, a medium is identified and used to select tables in which to populate with the keywords identified. Each message received is scored for each determined category (23).

Figure 3:
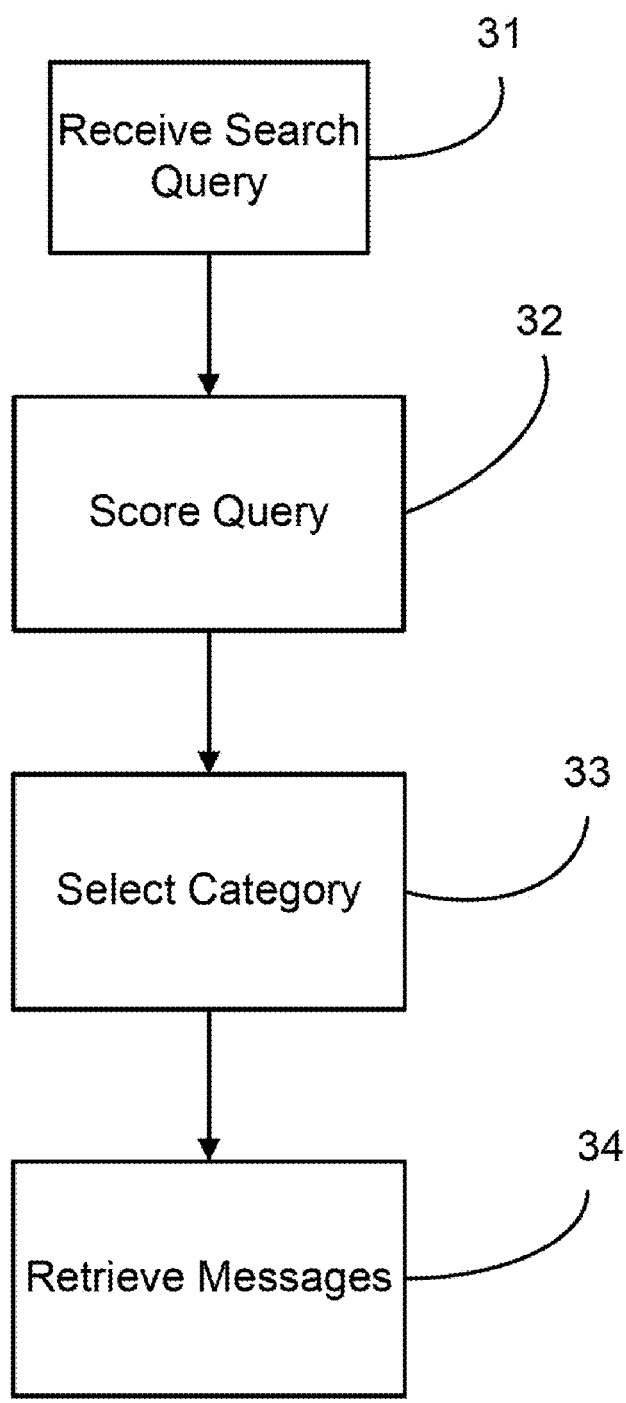
FIG. 3 is a flowchart illustrating a messaging search and retrieval process in accordance with various embodiments of the invention.

Referring now to FIG. 3, a messaging search and retrieval process starts with a search query being received (31). The query is scored for each category (32) and the category with the highest query score is selected (33). Messages with the highest score in this category and that contain some of the matched terms are returned as the message search results (34). In one embodiment, terms or words are extracted from the query and matched to keywords for the determined category.

Referring back to the "Amazon river" query example, two potential categories are established. It should be appreciated that the number of categories may be varied and numerous along with the associated keywords and messages, but are shown here in a limited fashion to facilitate the description of the invention. It should also be appreciated that although unigrams are largely described, bigrams or two words being considered as a single token, e.g., keyword or category, can also be utilized. Multiple or "N" words can also be used however there can be a diminishing return as more words are used. The first category is a geographical location category and the second category is a company category. As shown in the following tables, each category includes a set of keywords with associated normalized keyword frequency calculations.

TABLE 1

Geographical Location

| Normalized Keyword Frequency | Keywords |
|---|---|
| 0.2 | river |
| ... | ... |
| 0.05 | jungle |
| 0.05 | Amazon |
| 0.005 | hike |

TABLE 2

Company

| Normalized Keyword Frequency | Keywords |
|---|---|
| 0.5 | revenue |
| 0.2 | employee |
| 0.01 | Amazon |
| ... | ... |
| 0.0005 | jungle |
| 0.0001 | hike |

Utilizing the tables and in particular matching the keywords of each category with the terms in the search query, a query score is determined utilizing the associated normalized keyword frequency calculations. For example, the query score for the geographical location category is 0.25 (0.2 (river)+0.05 (Amazon)). Likewise, the query score for the company category is 0.01 (0.01 (Amazon)+0 (river)).

Given a first message, "Hiked to the Amazon today, what a beautiful jungle this is" and a second message, "Amazon announced revenue up 38%", messages scores can also be generated by matching keywords for each category and utilizing the associated normalized keyword frequency calculations. For example, the message score for the first message in the geographical category is 0.105 (0.05 (jungle)+0.05 (Amazon)+0.005 (hike)) and in the company category is 0.0106 (0.01 (Amazon)+0.0005 (jungle)+0.0001 (hike)). The second message score for the geographical category is 0.05 (Amazon) and for the company category 0.51 (0.5 (revenue)+0.01 (Amazon)).

Since the query score for the geographic category (0.25) is higher or larger than the query score for the company category (0.1), the geographic location category is selected to utilize the message scores for each of the messages. Thus, score (m1, geographic)=0.105 and score (m2, geographic)=0.05, where m1 and m2 are respective first and second messages. Since in the provided example, the search query is short, only one term matches, i.e., Amazon. Thus, the match values for each message are match(m1, q)=0.5 and match(m2, q)=0.5, where q is the query. Accordingly, the final score disregarding weight factors shows that the first message has a final score of 0.605 (0.105+0.5) greater than the final score of 0.55 (0.05+0.5) for the second message. Thus, the first message being the most relevant is provided as the search result for the given search query.

Figure 4:
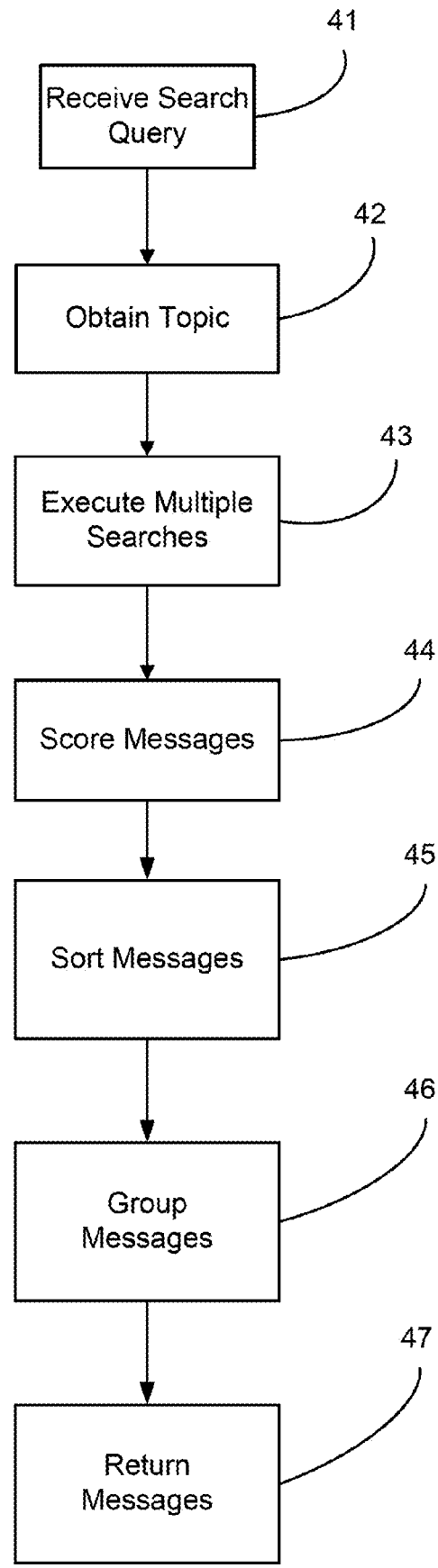
FIG. 4 is a flowchart illustrating a messaging search and retrieval process in accordance with various embodiments of the invention.

Referring now to FIG. 4, in one embodiment, a messaging search and retrieval process starts with a search query being received (41). A desired topic is also received (42). In one embodiment, the query is scored for each category and the category with the highest query score is selected as the desired topic. Utilizing the query and keywords from the desired topic, multiple searches are then conducted (43). In one embodiment, the multiple searches are parallel searches that retrieve messages that match the search query and iterative combinations of the search query and each of the top keywords from the desired topic. Retrieved or identified messages are scored (44) and sorted by score (45). Messages are placed or stored into equal size containers or bins or otherwise associated into groups in a storage medium or database (46). The messages in the top "N" number of bins messages are returned as the message search results (47). In one embodiment, the "N" number of bins are defined by a user's preference or predetermined by the messaging and retrieval system based on for example an estimated or determined processor or resource utilization or availability.

Although the present invention has been described in certain specific aspects, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

What is claimed:

1. A method of identifying messages on a social networking messaging service, comprising:
   receiving a search query using a message classification system, where the search query comprises at least one search query term;
   calculating a plurality of query scores for the search query with respect to a plurality of categories using the message classification system, where:
      each of the plurality of query scores is a score determined with respect to one of the plurality of categories;
      a predetermined plurality of keywords is related to each of the plurality of categories;
      a normalized keyword frequency is assigned to each of the predetermined plurality of keywords related to each of the plurality of categories, where the normalized keyword frequency is determined for a given predetermined keyword from the predetermined plurality of keywords based upon the frequency with which the given predetermined keyword appears within a predetermined training data set comprising a plurality of messages that are relevant to the category to which the given predetermined keyword is related; and
   calculating a given query score from the plurality of query scores for the search query with respect to a given category from the plurality of categories comprises using the normalized frequencies of the predetermined plurality of keywords related to the given category to determine a likelihood that the at least one search query term is present in a message relevant to the given category;
   storing the plurality of query scores for the search query with respect to the plurality of categories using the message classification system;
   identifying at least one category relevant to the search query based on the plurality of stored query scores using the message classification system;
   retrieving and scoring messages from a social messaging service based upon the search query and the identified at least one category relevant to the search query using the message classification system, where retrieving and scoring messages with respect to the search query and a particular category from the identified at least one category identified as being relevant to the search query using the message classification system comprises:
      performing a plurality of parallel searches that retrieve messages from a social networking messaging service that match the search query and iterative combinations of the search query and at least one of the predetermined plurality of keywords related to the particular category to retrieve messages likely to be relevant to the particular category using the message classification system;
      scoring the retrieved messages with respect to the search query and the particular category using the message classification system by:
         calculating a sum using the normalized frequencies of the predetermined plurality of keywords related to the particular category using the message classification system, where the sum is determined based at least in part upon the normalized frequencies of the predetermined plurality of keywords related to the particular category present in the retrieved message;
         calculating a ratio of search query terms in the retrieved message to the total number of search query terms using the message classification system;
         scoring the retrieved messages based upon the calculated sum and the calculated ratio using the message classification system; and
         storing the retrieved message scores using the message classification system;
   returning at least one of the retrieved messages as the search result based at least in part on the retrieved message scores using the message classification system.

2. The method of claim 1, wherein identifying at least one category relevant to the search query further comprises receiving a user input identifying at least one category relevant to the search query using the message classification system.

3. The method of claim 1, wherein calculating a sum using the normalized frequencies of the predetermined plurality of keywords related to the particular category using the message classification system further comprises calculating the sum with respect to messages retrieved using at least one of the predetermined plurality of keywords related to the particular category by excluding the at least one of the predetermined plurality of keywords related to the particular category used to retrieve the messages, when calculating the sum.

4. The method of claim 1, wherein performing a plurality of parallel searches that retrieve messages from a social networking messaging service further comprises performing expression matching using the message classification system.

5. The method of claim 1, wherein scoring the retrieved messages with respect to the particular category further comprises weighting the retrieved messages using the message classification system based upon the amount of time that has elapsed since the retrieved message was posted on the social networking messaging service.

6. A message classification system for identifying messages on a social networking messaging service, comprising:
    a message server configured to store search queries;
    a message database configured to store received messages; and
    wherein the message server is configured to:
        receive a search query, where the search query comprises at least one search query term;
        calculate a plurality of query scores for the search query with respect to a plurality of categories using the message classification system, where:
            each of the plurality of query scores is a score determined with respect to one of the plurality of categories;
            a predetermined plurality of keywords is related to each of the plurality of categories;
            a normalized keyword frequency is assigned to each of the predetermined plurality of keywords related to each of the plurality of categories, where the normalized keyword frequency is determined for a given predetermined keyword from the predetermined plurality of keywords based upon the frequency with which the given predetermined keyword appears within a predetermined training data set comprising a plurality of messages that are relevant to the category to which the given predetermined keyword is related; and
        wherein the message server is configured to a given query score from the plurality of query scores for the search query with respect to a given category from the plurality of categories using the normalized frequencies of the predetermined plurality of keywords related to the given category to determine a likelihood that the at least one search query term is present in a message relevant to the given category;
        identify at least one category relevant to the search query based on the plurality of stored one query scores using the message classification system;
        retrieve and score messages from a social messaging service based upon the search query and the identified at least one category relevant to the search query, where the message server is configured to messages with respect to the search query and a particular category from the identified at least one category identified as being relevant to the search query by:
            performing a plurality of parallel searches that retrieve messages from a social networking messaging service that match the search query and iterative combinations of the search query and at least one of the predetermined plurality of keywords related to the particular category to retrieve messages likely to be relevant to the particular category;
        scoring the retrieved messages with respect to the search query and the particular category by configuring the message server to:
        calculate a sum using the normalized frequencies of the predetermined plurality of keywords related to the particular category, where the sum is determined based at least in part upon the normalized frequencies of the predetermined plurality of keywords related to the particular category present in the retrieved message;
        calculate a ratio of search query terms in the retrieved message to the total number of search query terms; and
        score the retrieved messages based upon the calculated sum and the calculated ratio; and
        return at least one of the retrieved messages as the search result based at least in part on the retrieved message scores.

7. The system of claim 6, wherein the server is configured to identify at least one category relevant to the search query by receiving a user input identifying at least one category relevant to the search query.

8. The system of claim 6, wherein the server is further configured to calculate a sum using the normalized frequencies of the predetermined plurality of keywords related to the particular category by calculating the sum with respect to messages retrieved using at least one of the predetermined plurality of keywords related to the particular category by excluding the at least one of the predetermined plurality of keywords related to the particular category used to retrieve the messages.

9. The system of claim 6, wherein the server is configured to perform a plurality of parallel searches that retrieve messages from a social networking messaging service by performing expression matching.

10. The system of claim 6, wherein the server is configured to score the retrieved messages with respect to the particular category identified as being relevant to the search query by weighting the retrieved messages based upon the amount of time that has elapsed since the retrieved message was posted on the social networking messaging service.

11. The method of claim 1, where the parallel searches are performed by a plurality of processors in parallel.

12. The method of claim 1, where the parallel searches are performed iteratively.

13. The message classification system of claim 6, wherein the message classification system comprises a plurality of processors and the parallel searches are performed by the plurality of processors in parallel.

14. The message classification system of claim 6, where the parallel searches are performed iteratively.

* * * * *